US008570952B2

(12) United States Patent
Terry et al.

(10) Patent No.: US 8,570,952 B2
(45) Date of Patent: Oct. 29, 2013

(54) METHOD AND APPARATUS FOR SELECTIVELY ENABLING RECEPTION OF DOWNLINK SIGNALING CHANNELS

(75) Inventors: Stephen E. Terry, Northport, NY (US); Guodong Zhang, Farmingdale, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1458 days.

(21) Appl. No.: 11/095,401

(22) Filed: Mar. 31, 2005

(65) Prior Publication Data

US 2005/0243768 A1 Nov. 3, 2005

Related U.S. Application Data

(60) Provisional application No. 60/566,620, filed on Apr. 29, 2004.

(51) Int. Cl.
*H04W 4/00* (2009.01)

(52) U.S. Cl.
USPC ........ 370/329; 370/310; 370/310.2; 370/331; 370/318; 370/332; 455/450; 455/451; 455/452.1; 455/452.2

(58) Field of Classification Search
USPC ................ 370/329, 331, 310, 277, 299, 236, 370/310.2, 318, 332, 333, 346; 455/450, 455/451, 452.1, 452.2
See application file for complete search history.

(56) References Cited

U.S. PATENT DOCUMENTS 5,960,352 A * 9/1999 Cherpantier .................. 455/451
6,181,716 B1 * 1/2001 Lide ............................. 370/519
6,473,411 B1 * 10/2002 Kumaki et al. ............... 370/331
6,678,523 B1  1/2004 Ghosh et al.
6,711,180 B1 * 3/2004 Delesalle et al. ............. 370/474

(Continued)

FOREIGN PATENT DOCUMENTS

EP  1 180 907  2/2002
EP  1 282 276  2/2003

(Continued)

OTHER PUBLICATIONS

3GPP, TS 25.321, V6.1.0, Mar. 2004, Technical Specification Group Radio Access Network, Medium Access Control (MAC) Protocol Specification (Release 6).

(Continued)

*Primary Examiner* — Wayne Cai
(74) *Attorney, Agent, or Firm* — Volpe and Koenig, P.C.

(57) ABSTRACT

In a wireless communication system including a wireless transmit/receive unit (WTRU) and at least one Node-B, a method and apparatus is used to selectively enable reception of at least one downlink (DL) enhanced uplink (EU) signaling channel established between the WTRU and the Node-B(s). During the operation of an enhanced dedicated channel (E-DCH), the WTRU monitors at least one DL EU signaling channel established between the WTRU and the Node-B(s) only when it is necessary, based on the WTRU's knowledge of at least one established standard procedure. The WTRU coordinates and consolidates DL signaling channel reception requirements of a plurality of channel allocation and/or data transmission procedures carried out by the WTRU in accordance with the established standard procedure. The WTRU determines whether to enable reception of at least one specific DL signaling channel based on the consolidated DL signaling channel reception requirements.

23 Claims, 3 Drawing Sheets

(56) References Cited

U.S. PATENT DOCUMENTS

| | | | |
|---|---|---|---|
| 6,987,982 B2* | 1/2006 | Willenegger et al. | 455/515 |
| 7,079,485 B1* | 7/2006 | Lau et al. | 370/229 |
| 7,206,332 B2* | 4/2007 | Kwan et al. | 375/140 |
| 7,346,035 B2* | 3/2008 | Lee et al. | 370/331 |
| 2002/0172163 A1 | 11/2002 | Chen et al. | |
| 2002/0172208 A1* | 11/2002 | Malkamaki | 370/400 |
| 2002/0196766 A1* | 12/2002 | Hwang et al. | 370/342 |
| 2003/0039270 A1* | 2/2003 | Chang et al. | 370/469 |
| 2003/0207691 A1* | 11/2003 | Chen | 455/450 |
| 2003/0219037 A1 | 11/2003 | Toskala et al. | |
| 2003/0223452 A1* | 12/2003 | Toskala et al. | 370/442 |
| 2003/0227869 A1* | 12/2003 | Hsu et al. | 370/229 |
| 2004/0001459 A1 | 1/2004 | Chandhok et al. | |
| 2004/0120286 A1* | 6/2004 | Schwarz | 370/331 |
| 2004/0147262 A1* | 7/2004 | Lescuyer et al. | 455/434 |
| 2004/0208160 A1* | 10/2004 | Petrovic et al. | 370/350 |
| 2005/0054358 A1* | 3/2005 | Zhang et al. | 455/509 |
| 2005/0078629 A1* | 4/2005 | Bi et al. | 370/329 |
| 2005/0083943 A1* | 4/2005 | Lee et al. | 370/395.4 |
| 2005/0111358 A1* | 5/2005 | Hsu et al. | 370/229 |
| 2007/0091852 A1* | 4/2007 | Malladi et al. | 370/332 |
| 2007/0127369 A1* | 6/2007 | Sebire | 370/229 |
| 2007/0140258 A1 | 6/2007 | Tan et al. | |
| 2007/0165575 A1* | 7/2007 | Niwano | 370/335 |

FOREIGN PATENT DOCUMENTS

| | | |
|---|---|---|
| JP | 2002-261372 | 9/2002 |
| WO | 02/093776 | 11/2002 |
| WO | 03/065739 | 8/2003 |

OTHER PUBLICATIONS

3GPP, TS 25.321, V6.4.0, Mar. 2005, Technical Specification Group Radio Access Network, Medium Access Control (MAC) Protocol Specification (Release 6).

3GPP, TS 25.309, V6.2.0, Mar. 2005, Technical Specification Group Radio Access Network, FDD Enhanced Uplink, Stage 2 (Release 6).

3GPP TR 25.896, V6.0.0, Mar. 2004, Technical Specification Group Radio Access Network, Feasibility Study for Enhanced Uplink for UTRA FDD (Release 6).

Third Generation Partnership Project, "Technical Specification Group Radio Access Network; Medium Access Control (MAC) Protocol Specification (Release 1999)," 3GPP TS 25.321 v3.321 v3.16.0 (Sep. 2003).

Third Generation Partnership Project, "Technical Specification Group Radio Access Network; Medium Access Control (MAC) Protocol Specification (Release 1999)," 3GPP TS 25.321 v3.321 v3.17.0 (Jun. 2004).

Third Generation Partnership Project, "Technical Specification Group Radio Access Network; Medium Access Control (MAC) Protocol Specification (Release 4)," 3GPP TS 25.321 v4.9.0 (Sep. 3003).

Motorola et al., "Enhanced Uplink Dedicated Transport Channel," 3GPP RAN1 #31, Tdoc# R1-03-0359 (Feb. 18-21, 2003).

Third Generation Partnership Project, "Technical Specification Group Radio Access Network; Medium Access Control (MAC) Protocol Specification (Release 1999)," 3GPP TS 25.321 v3.17.0 (Jun. 2004).

Third Generation Partnership Project, "Technical Specification Group Radio Access Network; Medium Access Control (MAC) Protocol Specification (Release 4)," 3GPP TS 25.321 v4.9.0 Sep. 2003).

Third Generation Partnership Project, "Technical Specification Group Radio Access Network; Feasibility Study for Enhanced Uplink for UTRA A FDD (Release 6)," 3GPP TR 25.896 V6.0.0 (Mar. 2004).

Third Generation Partnership Project, "Technical Specification Group Radio Access Network; Access Control (MAC) Protocol Specification (Release 6)," 3GPP TS 25.321 v6.4.0 (Mar. 2005).

Motorola et al., "Enhanced Uplink Dedicated Transport Channel," 3GPP RAN1 #31, (Feb. 18-21, 2003).

Third Generation Partnership Project, "Technical Specification Group Radio Access Network; FDD Enhanced Uplink; Overall Description; Stage 2 (Release 6)," 3GPP TS 25.309 V6.2.0 (Mar. 2005).

Third Generation Partnership Project, "Technical Specification Group Radio Access Network; Medium Access Control (MAC) Protocol Specification (Release 1999)," 3GPP TS 25.321 v3.16.0 (Sep. 2003).

Third Generation Partnership Project, "Technical Specification Group Radio Access Network; Medium Access Control (MAC) Protocol Specification (Release 1999)," 3GPP TS 25.321 v3.17.0 (Jun. 2004).

Third Generation Partnership Project, "Technical Specification Group Radio Access Network; Medium Access Control (MAC) Protocol Specification (Release 4)," 3GPP TS 25.321 v4.9.0 (Sep. 2003).

Third Generation Partnership Project, "Technical Specification Group Radio Access Network; Medium Access Control (MAC) Protocol Specification (Release 4)," 3GPP TS 25.321 v4.10.0 (Jun. 2004).

Third Generation Partnership Project, "Technical Specification Group Radio Access Network; Medium Access Control (MAC) Protocol Specification (Release 5)," 3GPP TS 25.321 v5.8.0 (Mar. 2004).

Third Generation Partnership Project, "Technical Specification Group Radio Access Network; Medium Access Control (MAC) Protocol Specification (Release 5)," 3GPP TS 25.321 v5.10.0 (Dec. 2004).

Third Generation Partnership Project, "Technical Specification Group Radio Access Network; Medium Access Control (MAC) Protocol Specification (Release 6)," 3GPP TS 25.321 v6.1.0 (Mar. 2004).

Third Generation Partnership Project, "Technical Specification Group Radio Access Network; Medium Access Control (MAC) Protocol Specification (Release 6)," 3GPP TS 25.321 v6.4.0 (Mar. 2005).

Third Generation Partnership Project, "Technical Specification Group Radio Access Network; Feasibility Study for Enhanced Uplink for UTRA FDD (Release 6)," 3GPP TR 25.896 V6.0.0 (Mar. 2004).

Motorola, "AH64: Uplink HARQ Schemes and SHO considerations," 3GPP RAN1 #30, (Jan. 7-11, 2003).

QUALCOMM, "Channel Structure for Consideration in Enhanced Uplink," 3GPP TSG RAN WG1 #31, (Feb. 18-21, 2003).

Lucent Technologies, "Enhancing the Uplink DCH—Adaptive Modulation and Coding," 3GPP TSG-RAN1 #29, (Nov. 5-8, 2002).

Lucent Technologies, "Enhancing the Uplink DSCH—Scheduling Options," 3GPP TSG-RAN1 #29, (Nov. 5-8, 2002).

* cited by examiner

METHOD AND APPARATUS FOR SELECTIVELY ENABLING RECEPTION OF DOWNLINK SIGNALING CHANNELS

CROSS REFERENCE TO RELATED APPLICATION

This application claims the benefit of U.S. Provisional Application No. 60/566,620 filed Apr. 29, 2004, which is incorporated by reference as if fully set forth.

FIELD OF INVENTION

The present invention is related to a wireless communication system including a wireless transmit/receive unit (WTRU) and at least one Node-B. More particularly, the present invention is a method and apparatus for selectively enabling reception of downlink (DL) enhanced uplink (EU) signaling channels established between the WTRU and the Node-B(s).

BACKGROUND

Methods for improving uplink (UL) coverage, throughput and transmission latency are being investigated in Release 6 (R6) of the 3rd Generation Partnership Project (3GPP). In order to successfully implement these methods, the scheduling and assigning of UL radio resources have been moved from a radio network controller (RNC) to a Node-B such that the Node-B can make decisions and manage UL radio resources on a short-term basis more efficiently than the RNC, even if the RNC retains overall control over the Node-B.

EU operation requires transmitting information such as UL channel allocations and transmission feedback information to the WTRU via DL EU signaling channels. The WTRU monitors the DL EU signaling channels for the reception of channel allocations and transmission feedback information.

A method and apparatus is desired for controlling reception of the DL EU signaling channels such that they are enabled only when required.

SUMMARY

The present invention is a method and apparatus for selectively enabling reception of at least one DL EU signaling channel used for EU operation. During the operation of an enhanced dedicated channel (E-DCH), a WTRU monitors at least one DL EU signaling channel established between the WTRU and at least one Node-B only when it is necessary, based on the WTRU's knowledge of at least one established standard procedure. The WTRU coordinates and consolidates DL signaling channel reception requirements of a plurality of channel allocation and/or data transmission procedures carried out by the WTRU in accordance with the established standard procedure. The WTRU determines whether to enable reception of at least one specific DL signaling channel based on the consolidated DL signaling channel reception requirements.

In accordance with the present invention, the WTRU does not have to continuously enable the reception of the DL EU signaling channel during EU operation. Instead, the WTRU may selectively turn on and off, (i.e., enable and disable), reception of at least one specific DL EU signaling channel, thus reducing WTRU processing requirements and reducing the probability of misinterpretation of DL signaling.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
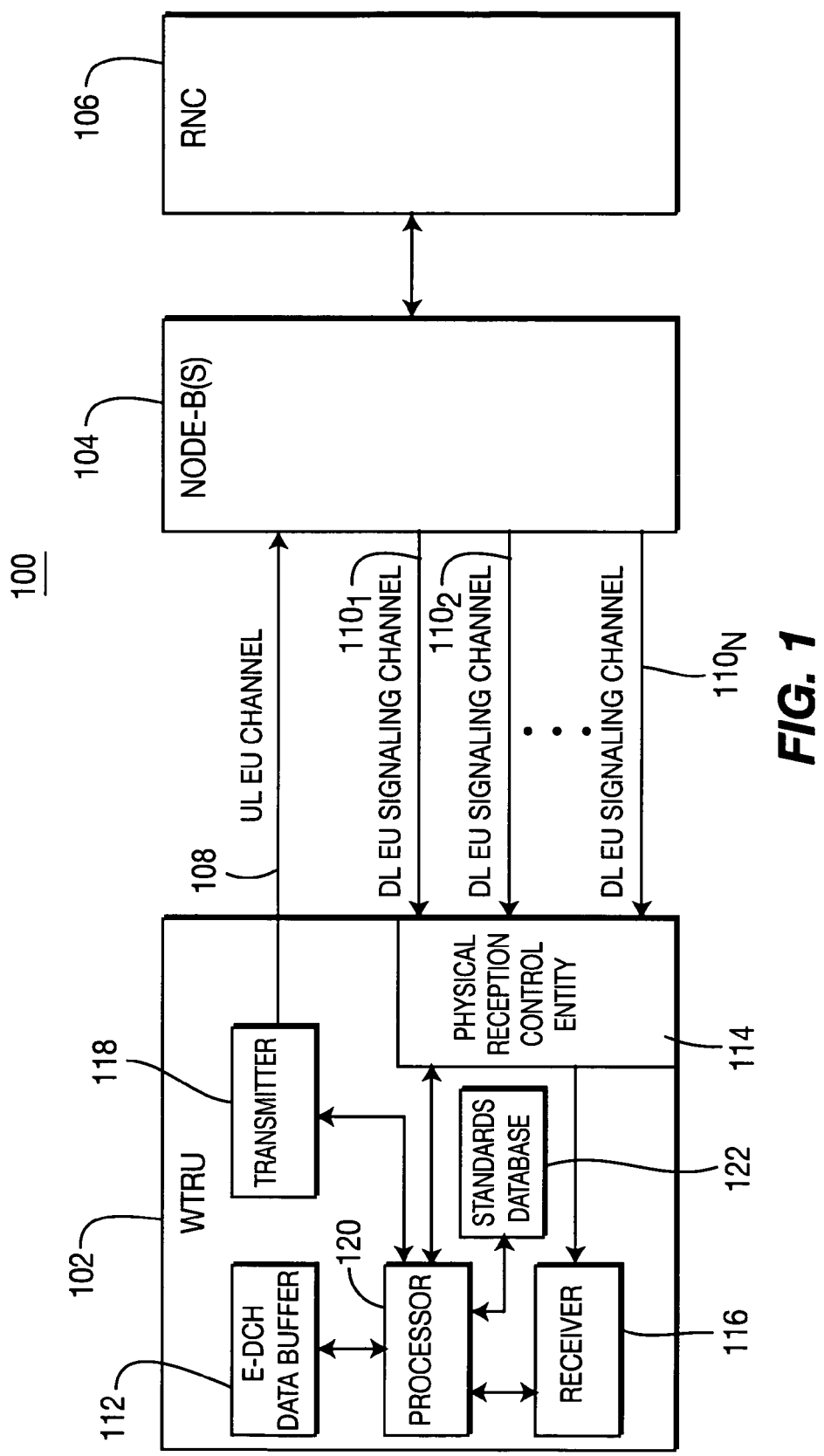
FIG. 1 is a block diagram of a wireless communication system operating in accordance with the present invention.

FIG. 1 is a block diagram of a wireless communication system 100 operating in accordance with the present invention. The system 100 includes a WTRU 102, at least one Node-B 104 and an RNC 106. The WTRU 102 includes an E-DCH data buffer 112, a physical reception control entity 114, a receiver 116, a transmitter 118, a processor 120 and a standards database 122.

The transmitter 118 in the WTRU 102 transmits an EU channel allocation request, (i.e., a rate request), to the Node-B(s) 104 through a UL EU channel 108 for EU transmission to the Node-B 104. The EU channel allocation request may include scheduling information. The scheduling information may include traffic volume measurement (TVM) information of E-DCH data stored in the buffer 112 of the WTRU 102 and available EU transmit power information.

After the EU channel allocation request is transmitted, the receiver 116 in the WTRU 102 monitors a plurality of DL EU signaling channels $110_1, 110_2, \ldots, 110_N$ for channel allocation information via the physical reception control entity 114. The Node-B(s) 104 responds to the EU channel allocation request with UL channel allocation information through one of the DL EU signaling channels $110_{1-N}$.

The system 100 is configured such that both UL signaling and E-DCH data are transmitted from the WTRU 102 to the Node-B(s) 104 via the UL EU channel 108. After receiving scheduling information for channel allocation from the Node-B(s) 104 through at least one of the DL EU signaling channels $110_{1-N}$, the transmitter 118 in the WTRU 102 transmits E-DCH data through the allocated UL EU channel 108. The receiver 116 in the WTRU 102 then monitors the DL EU signaling channel(s) $110_{1-N}$ for expected E-DCH data feedback information.

In response to receiving the E-DCH data, the Node-B(s) 104 transmits E-DCH data feedback information to the WTRU 102 through the DL EU signaling channels $110_1$-N. The feedback information includes either a positive acknowledgement (ACK) message or a negative acknowledgement (NACK) message, depending on the success or failure of the Node-B(s) 104 decoding the E-DCH data sent over the UL EU channel 108 by the WTRU 102. The Node-B(s) 104 may also transmit further channel allocation information in response to the E-DCH data transmission. Such further information may be included in the feedback information or may be sent as a separate transmission over the DL EU signaling channels $110_{1-N}$.

The status of active EU procedures in the WTRU 102 may be used to provide input to the physical reception control entity 114 of the WTRU 102. The physical reception control entity 114 communicates with a physical layer process to selectively enable and disable reception of the DL EU signaling channels $110_{1-N}$.

In accordance with the present invention, the physical reception control entity 114 in the WTRU 102 disables reception, (i.e., ceases monitoring), of the DL EU signaling channels $110_{1-N}$ when it is not required by EU signaling procedures known to the WTRU 102. During periods when the WTRU 102 is not required to receive the DL EU signaling channels $110_{1-N}$, the processing requirements and power consumption of the WTRU 102 are reduced, and the possibility of false interpretation of DL signaling is avoided.

Figure 2:
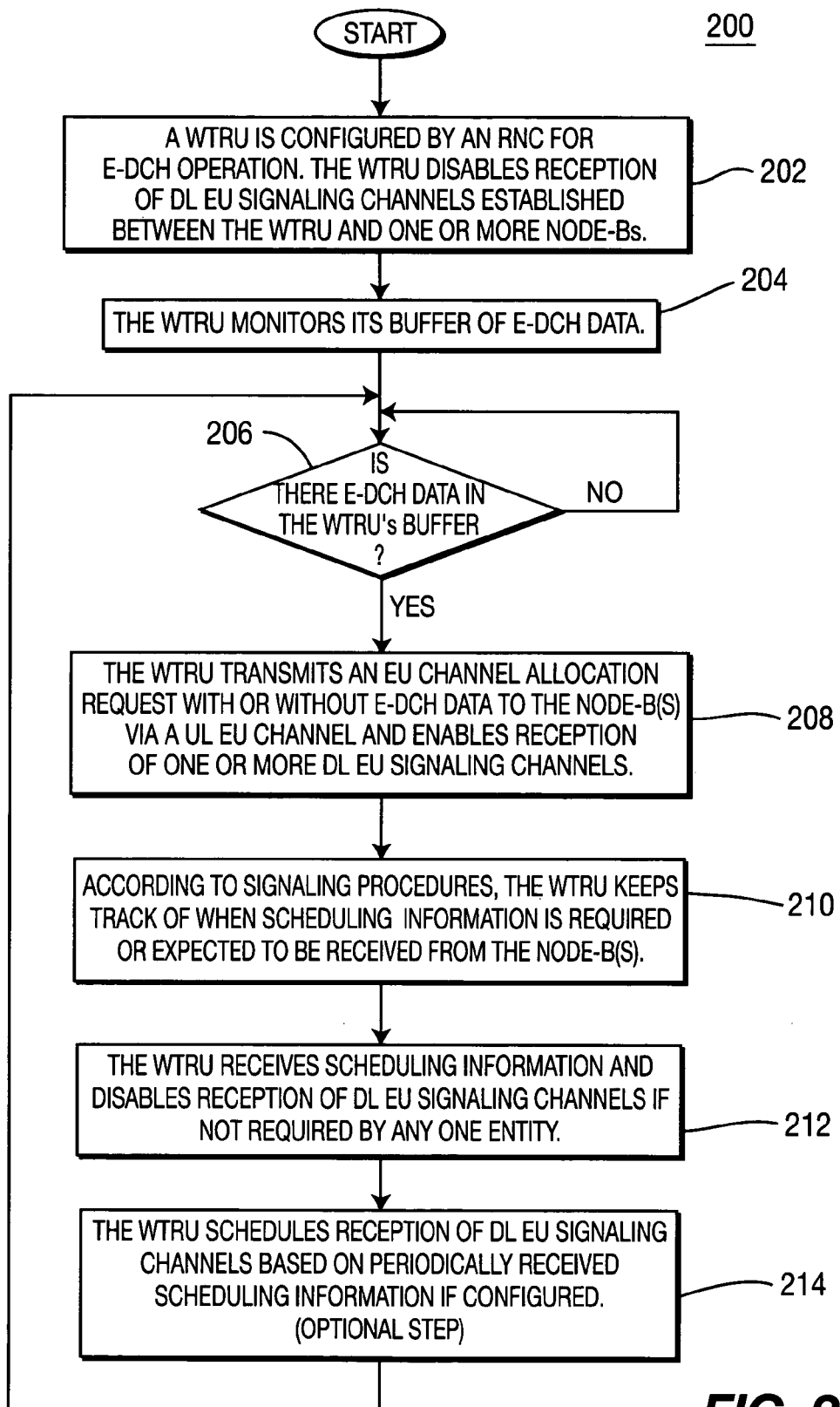
FIG. 2 is a flow diagram of a process including method steps for selectively enabling reception of at least one DL EU signaling channel during EU operation when the WTRU sends an EU channel allocation request and is expecting to receive scheduling information in accordance with one embodiment of the present invention.

FIG. 2 is a flow diagram of a process 200 including method steps for selectively enabling reception of at least one DL EU signaling channel $110_{1-N}$ during EU transmission in accordance with the present invention. In step 202, the WTRU 102 is configured by the RNC 106 for E-DCH operation, whereby the UL EU channel 108 and the DL EU signaling channel(s) $110_{1-N}$ are established between the WTRU 102 and the Node-B(s) 104. The WTRU 102 is not required to enable the reception of its DL EU signaling channel(s) $110_{1-N}$ immediately following configuration in the WTRU 102. Thus, the physical reception control entity 114 in the WTRU 102 disables reception of DL EU signal channel(s) $110_{1-N}$.

Still referring to FIG. 2, after the WTRU 102 is configured for E-DCH operation at step 202, the WTRU 102 monitors its buffer 112 of E-DCH data (step 204). If, at step 206, it is determined by the WTRU 102 that there is no E-DCH data in the buffer 112, the WTRU 102 continues to monitor the buffer 112, and reception of the DL EU signaling channels $110_{1-N}$ remains disabled at step 204. If, at step 206, it is determined by the WTRU 102 that there is E-DCH data waiting (i.e., queued) for transmission via the UL EU channel 108, the WTRU 102 transmits an EU channel allocation request with or without E-DCH data to the Node-B(s) 104 via the UL EU channel 108 and enables reception of at least one DL EU signaling channel $110_{1-N}$ (step 208). The WTRU 102 may optionally enable reception of DL EU signaling channel(s) $110_{1-N}$ after a predetermined or calculated delay. The EU channel allocation request may include scheduling information such as TVM information and available EU transmit power information.

Operation of E-DCH requires radio resource allocations to be scheduled and signaled by the Node-B(s) 104 to the WTRU 102 in response to an EU channel allocation request transmitted by the WTRU 102. According to established signaling procedures, the WTRU 102 keeps track of when E-DCH data transmission scheduling information including EU channel allocations is required or expected to be received from the Node-B(s) on at least one DL EU signaling channel $110_{1-N}$ based on information indicating when the EU channel allocation request was transmitted by the WTRU 102 (step 210).

In step 212, the WTRU 102 receives the required or expected scheduling information from the Node-B(s) over the DL EU signaling channel(s) $110_{1-N}$ and then, if not required by any one entity, the physical reception control entity 114 disables reception of DL EU signaling channel(s) $110_{1-N}$. Optionally, in step 214, the WTRU 102 schedules reception of DL EU signaling channel(s) $110_{1-N}$ based on periodically received DL EU signaling channel scheduling information if configured. Reception of specific DL EU signaling channel(s) 1101N is enabled, depending on which EU signaling procedures are active in the WTRU 102.

Figure 3:
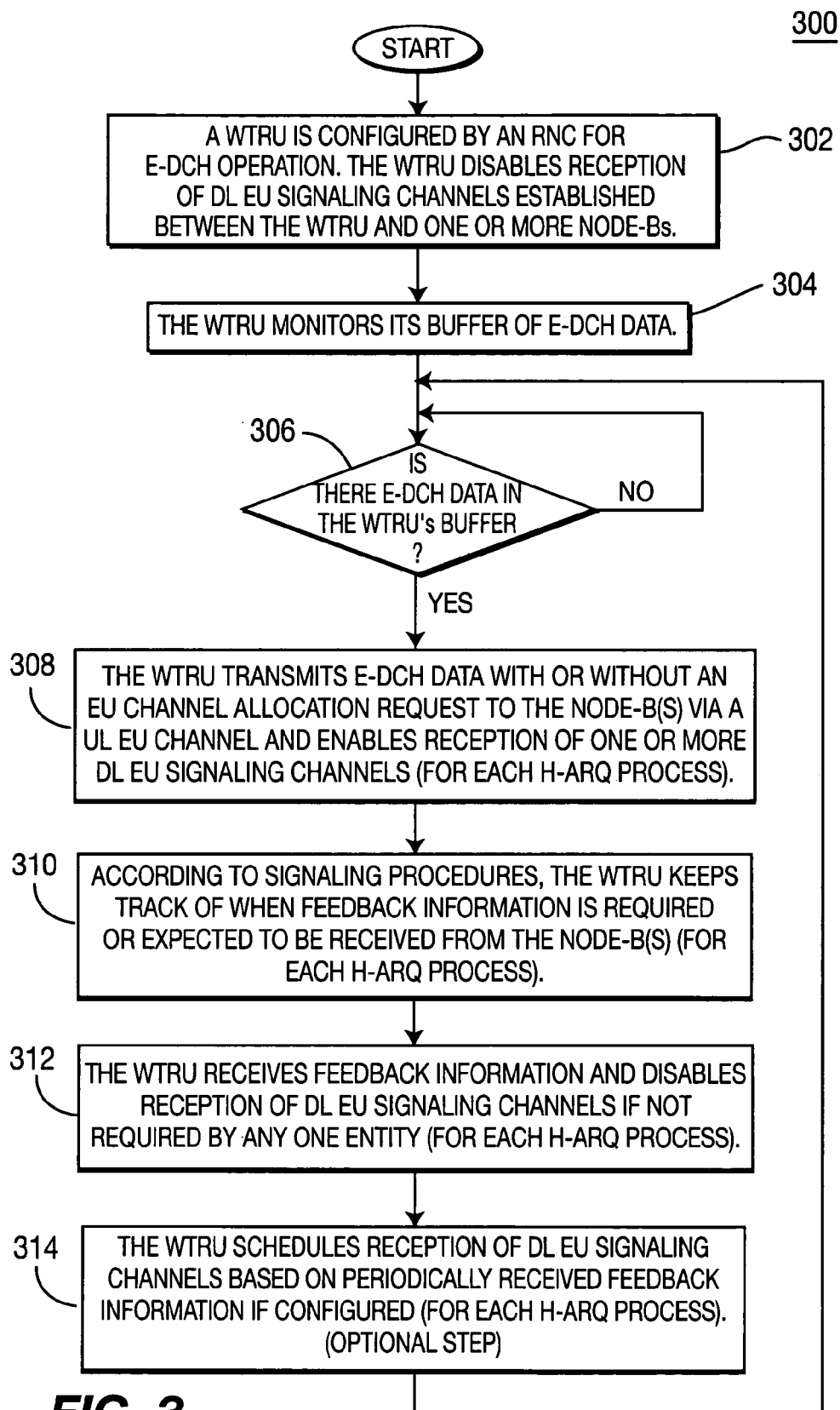
FIG. 3 is a flow diagram of a process including method steps for selectively enabling reception of at least one DL EU signaling channel when the WTRU sends E-DCH data and is expecting to receive feedback information in accordance with another embodiment of the present invention.

FIG. 3 is a flow diagram of a process 300 including method steps for selectively enabling reception of the DL EU signaling channels $110_{1-N}$ when the WTRU 102 sends E-DCH data and is expecting to receive feedback information in accordance with another embodiment of the present invention. In step 302, the WTRU 102 is configured by the RNC 106 for E-DCH operation whereby the UL EU channel 108 and the DL EU signaling channel(s) $110_{1-N}$ are established between the WTRU 102 and the Node-B(s) 104. The WTRU 102 is not required to enable the reception of its DL EU signaling channel(s) $110_{1-N}$ immediately following the E-DCH operation configuration of the WTRU 102. Thus, the physical reception control entity 114 in the WTRU 102 disables reception of DL EU signal channel(s) $110_{1-N}$.

Still referring to FIG. 3, after the WTRU 102 is configured to perform an E-DCH operation at step 302, the WTRU 102 monitors its buffer 112 of E-DCH data (step 304). If at step 306 it is determined by the WTRU 102 that there is no E-DCH data in the buffer 112, the WTRU 102 continues to monitor the buffer 112, and reception of the DL EU signaling channel(s) $110_{1-N}$ remains disabled at step 304.

Steps 308, 310, 312 and 314 of process 300 may be performed for each of a plurality of several hybrid-automatic repeat request (H-ARQ) processes operating in parallel in the WTRU. If at step 306 it is determined by the WTRU 102 that there is E-DCH data waiting (i.e., queued) for transmission via the UL EU channel 108, for each H-ARQ process, the WTRU 102 transmits E-DCH data with or without an EU channel allocation request to the Node-B(s) 104 via the UL EU channel 108 and enables reception of DL EU signaling channel(s) $110_{1-N}$ (step 308). The WTRU 102 may optionally enable reception of DL EU signaling channel(s) $110_{1-N}$ after a predetermined or calculated delay.

According to established signaling procedures, the WTRU 102 keeps track of when feedback information is required or expected to be received from the Node-B(s) 104 for each H-ARQ process (step 310). In step 312, the WTRU receives feedback information from the Node-B(s) 104 and disables reception of the DL EU signaling channel(s) $110_{1-N}$ if not required by any one entity. Optionally, in step 314, the WTRU 102 schedules reception of the DL EU signaling channel(s) $110_{1-N}$ based on periodically received feedback information if configured. Reception of specific DL EU signaling channel(s) $110_{1-N}$ is enabled, depending on which EU signaling procedures are active in the WTRU 102.

The WTRU 102 keeps track of when scheduling information including EU channel allocations is expected to be received on DL EU signaling channels $110_{1-N}$ based on information indicating when the WTRU 102 transmitted the E-DCH data. DL EU signaling channels $110_{1-N}$ are also used to provide the WTRU 102 feedback information from the Node-B(s) 104 for E-DCH transmissions. Since feedback transmitted to the WTRU is in response to a specific action of the WTRU, the time of feedback information reception at the WTRU can be accurately determined by the WTRU. Feedback information transmitted by the Node-B(s) 104 via the DL EU signaling channel(s) 110$_{1-N}$ may consist of H-ARQ acknowledgements and/or UL channel allocation information. One example of WTRU reception of feedback channels could be H-ARQ information channels (HICHs) and relative grant channels (RGCHs) or absolute grant channels (AGCH) in 3GPP.

The H-ARQ operation may be either synchronous or asynchronous. In synchronous operation, the WTRU 102 knows exactly when the WTRU 102 may receive the feedback (ACK or NACK) via DL EU signaling channel(s) 110$_{1-N}$ and the WTRU 102 enables reception of the DL EU signaling channel(s) 110$_{1-N}$ in accordance with a preconfigured schedule. With asynchronous H-ARQ operation, the WTRU enables reception of the DL EU signaling channel(s) 110$_{1-N}$ for a predetermined time period following the EU transmission for receiving the feedback.

Channel allocation feedback may also be transmitted to the WTRU 102 from the Node-B(s) 104 on DL EU signaling channel(s) 110$_{1-N}$. The WTRU 102 may also enable reception of DL EU signaling channel(s) 110$_{1-N}$ for this channel allocation feedback information. EU channel allocation procedures known to the WTRU 102 allow the WTRU 102 to schedule reception of this information. The channel allocation feedback may either be synchronized with the H-ARQ feedback, send over a predetermined period, or have a specified periodic repetition that the WTRU 102 can schedule reception for.

If the WTRU 102 does not send a channel allocation request to the Node-B(s) 104, but all previous EU data transmission requests sent by the WTRU 102 have been serviced by the Node-B(s) 104, and feedback information was received from the Node-B for all outstanding H-ARQ transmissions, then the WTRU 102 disables the reception of the DL EU signaling channel(s) 110$_{1-N}$.

In one embodiment, the WTRU 102 sends at least one channel allocation request to a plurality of Node-Bs 104 via at least one UL channel 108, and the Node-Bs send channel allocation information to the WTRU 102 via respective downlink (DL), signaling channels 110$_{1-N}$ in response to receiving the channel allocation request.

The processor 120 in the WTRU 102 coordinates and consolidates DL signaling channel reception requirements of a plurality of channel allocation procedures carried out by the WTRU 102 in accordance with at least one established standard procedure stored in the standards database 122, and determines whether or not to enable reception of specific ones of the DL signaling channels 110$_{1-N}$ based on the consolidated DL signaling channel reception requirements. The standards database 120 is in communication with the processor 120 and provides the processor 120 with information associated with at least one established standard procedure. The transmitter 118 is in communication with the processor 120 and sends at least one channel allocation request to the Node-Bs 104 via at least one UL channel 108. The receiver 116 is in communication with the processor 120 and receives channel allocation information from the Node-Bs 104 over the DL signaling channels 110$_{1-N}$. The physical reception control entity 114 is in communication with the processor 120 and the receiver 116. The physical reception control entity 114 enables or disables reception of specific ones of the DL signaling channels 110$_{1-N}$ based on the determination made by the processor 120.

In another embodiment, the WTRU 102 sends at least one data transmission to a plurality of Node-Bs 104 via at least one UL channel 108, and the Node-Bs 104 send data transmission feedback information to the WTRU 102 via respective downlink (DL) signaling channels 110$_{1-N}$ in response to receiving the data transmission.

The processor 120 in the WTRU 102 coordinates and consolidates DL signaling channel reception requirements of a plurality of data transmission procedures carried out by the WTRU in accordance with at least one established standard procedure stored in the standards database 122, and determines whether or not to enable reception of specific ones of the DL signaling channels 110$_{1-N}$ based on the consolidated DL signaling channel reception requirements. The E-DCH data buffer 112 is in communication with the processor 120 and queues data to be included in at least one data transmission sent by the WTRU 102 to the Node-Bs 104 via at least one UL channel 108. The transmitter 118 is in communication with the processor and sends the at least one data transmission to the Node-Bs 104. The receiver 116 is in communication with the processor 120 and receives data transmission feedback information from the Node-Bs 104 over the DL signaling channels 110$_{1-N}$. The physical reception control entity 114 is in communication with the processor 120 and the receiver 116. The physical reception control entity 114 enables or disables reception of specific ones of the DL signaling channels 110$_{1-N}$ based on the determination made by the processor 120.

In yet another embodiment, the WTRU 102 sends at least one channel allocation request and E-DCH data to a plurality of Node-Bs 104 via at least one UL channel 108, and the Node-Bs send channel allocation information and data feedback information associated with the E-DCH data to the WTRU 102 via respective downlink (DL) signaling channels 110$_{1-N}$ in response to receiving the at least one channel allocation request and E-DCH data.

The processor 120 in the WTRU 102 coordinates and consolidates DL signaling channel reception requirements of a plurality of channel allocation procedures and data transmission procedures carried out by the WTRU 102 in accordance with at least one established standard procedure stored in the standards database 122, and determines whether or not to enable reception of specific ones of the DL signaling channels 110$_{1-N}$ based on the consolidated DL signaling channel reception requirements. The standards database 120 is in communication with the processor 120 and provides the processor 120 with information associated with at least one established standard procedure. The transmitter 118 is in communication with the processor 120 and sends at least one channel allocation request and E-DCH data to the Node-Bs 104 via at least one UL channel 108. The receiver 116 is in communication with the processor 120 and receives channel allocation information from the Node-Bs 104 over the DL signaling channels 110$_{1-N}$. The physical reception control entity 114 is in communication with the processor 120 and the receiver 116. The physical reception control entity 114 enables or disables reception of specific ones of the DL signaling channels 110$_{1-N}$ based on the determination made by the processor 120.

Although the features and elements of the present invention are described in the preferred embodiments in particular combinations, each feature or element can be used alone without the other features and elements of the preferred embodiments or in various combinations with or without other features and elements of the present invention.

What is claimed is:
1. A method for channel resource allocation implemented in a wireless transmit/receive unit (WTRU) comprising:

sending, by the WTRU, an enhanced uplink (EU) channel allocation request via an uplink (UL) EU channel used for sending enhanced dedicated channel (E-DCH) data;

receiving, by the WTRU, channel allocation information via a downlink (DL) EU signaling channel in response to sending the channel allocation request; and determining, by the WTRU, whether to utilize the DL EU signaling channel according to at least one predetermined signaling procedure using at least one synchronous hybrid automatic repeat request (HARQ) process that enables reception of the DL EU signaling channel in accordance with a preconfigured schedule.

2. The method of claim 1, wherein the DL EU signaling channel is a relative grant channel.

3. The method of claim 1, wherein the DL EU signaling channel is an absolute grant channel.

4. The method of claim 1, wherein the synchronous HARQ process enables the WTRU to know exactly when feedback information will be received via the DL EU signaling channel.

5. A method for channel resource allocation implemented in a wireless transmit/receive unit (WTRU), comprising:

sending, by the WTRU, an enhanced uplink (EU) channel allocation request including enhanced dedicated channel (E-DCH) data via at least one uplink (UL) channel;

receiving, by the WTRU, channel allocation information and data feedback information via respective downlink (DL) signaling channels in response to sending the channel allocation request including E-DCH data; and determining, by the WTRU, whether to utilize at least one of the respective DL signaling channels according to at least one predetermined signaling procedure using at least one synchronous hybrid automatic repeat request (HARQ) process that enables reception of the at least one respective DL signaling channel in accordance with a preconfigured schedule.

6. The method of claim 5, wherein the at least one respective DL signaling channel is a relative grant channel.

7. The method of claim 5, wherein the at least one respective DL signaling channel is an absolute grant channel.

8. The method of claim 5, wherein the synchronous HARQ process enables the WTRU to know exactly when feedback information will be received via the at least one respective DL signaling channel.

9. A method for channel resource allocation implemented in a wireless transmit/receive unit (WTRU) comprising:

transmitting, by the WTRU, an enhanced uplink (EU) channel allocation request over an uplink (UL) EU channel, wherein the allocation request includes scheduling information;

monitoring, by the WTRU, a plurality of downlink (DL) EU signaling channels according to at least one predetermined signaling procedure;

receiving, by the WTRU, UL channel allocation information through at least one of the DL EU signaling channels; and selectively utilizing, by the WTRU, at least one of the DL EU signaling channels according to the at least one predetermined signaling procedure using at least one synchronous hybrid automatic repeat request (HARQ) process that enables reception of the at least one DL EU signaling channel in accordance with a preconfigured schedule.

10. The method of claim 9 further comprising:
transmitting a plurality of UL signaling data; and
transmitting enhanced dedicated channel (E-DCH) data through the UL EU channel.

11. The method of claim 10 further comprising:
receiving further channel allocation information in response to the transmitted E-DCH data.

12. The method of claim 9 further comprising:
monitoring the DL EU signaling channels for enhanced dedicated channel (E-DCH) data feedback information; and
receiving E-DCH data feedback information through the DL EU signaling channels including either a positive acknowledgement (ACK) message or a negative acknowledgement (NACK) message.

13. The method of claim 9 further comprising:
monitoring the DL EU signaling channels for enhanced dedicated channel (E-DCH) channel resource allocation information; and
receiving E-DCH channel resource allocation information through the DL EU signaling channels including at least one of a Relative Grant (RG) and Absolute Grant (AG).

14. The method of claim 9, wherein the scheduling information includes any one of the following:
traffic volume measurement information of enhanced dedicated channel (E-DCH) data stored in a buffer; and
available EU transmit power information.

15. The method of claim 9 further comprising:
disabling reception of the DL EU signaling channels on a condition that the DL EU signaling channels are not required by the at least one predetermined signaling procedure.

16. The method of claim 9, wherein the channel allocation information includes any one of the following:
a channelization code; and
an allowed transmit power.

17. The method of claim 9, wherein the at least one DL EU signaling channel is a relative grant channel.

18. The method of claim 9, wherein the at least one DL EU signaling channel is an absolute grant channel.

19. The method of claim 9, wherein the synchronous HARQ process enables the WTRU to know exactly when feedback information will be received via the at least one DL EU signaling channel.

20. A method for allocation processing implemented in a wireless transmit/receive unit (WTRU), comprising:

processing, by the WTRU, downlink (DL) signaling channel reception requirements of a plurality of channel allocation procedures; and determining, by the WTRU, whether to utilize a DL signaling channel according to at least one predetermined signaling procedure using at least one synchronous hybrid automatic repeat request (HARQ) process that enables reception of the DL signaling channel in accordance with a preconfigured schedule.

21. The method of claim 20, wherein the DL signaling channel is a relative grant channel.

22. The method of claim 20, wherein the DL signaling channel is an absolute grant channel.

23. The method of claim 20, wherein the synchronous HARQ process enables the WTRU to know exactly when feedback information will be received via the DL signaling channel.

* * * * *

UNITED STATES PATENT AND TRADEMARK OFFICE
CERTIFICATE OF CORRECTION

PATENT NO. : 8,570,952 B2
APPLICATION NO. : 11/095401
DATED : October 29, 2013
INVENTOR(S) : Stephen E. Terry, Guodong Zhang and Stephen G. Dick Page 1 of 2

It is certified that error appears in the above-identified patent and that said Letters Patent is hereby corrected as shown below:

On the Title Page

At Item (56), References Cited, OTHER PUBLICATIONS, page 2, left Column, Line 9, after "Malkamaki", insert --et al.--.

At Item (56), References Cited, OTHER PUBLICATIONS, page 2, left Column, Line 44, after "3GPP TS 25.321" and before the words "v3.16.0", delete "v3.321".

At Item (56), References Cited, OTHER PUBLICATIONS, page 2, left Column, Line 48, after "3GPP TS 25.321" and before the words "v3.17.0", delete "v3.321".

At Item (56), References Cited, OTHER PUBLICATIONS, page 2, right Column, Line 6, after "Uplink for", delete "UTRAA FDD" and insert therefor --UTRA FDD--.

At Item (56), References Cited, OTHER PUBLICATIONS, page 2, right Column, Line 12, after "3GPP RAN #31," insert --Tdoc# R1-03-0359--.

At Item (56), References Cited, OTHER PUBLICATIONS, page 2, right Column, Line 50, after "3GPPRAN1#30," insert --Tdoc# R1-030068--.

At Item (56), References Cited, OTHER PUBLICATIONS, page 2, right Column, Line 52, after "3GPP TSG RAN WG1 #31" insert --Tdoc R1-03-0273--.

At Item (56), References Cited, OTHER PUBLICATIONS, page 2, right Column, Line 54, after "3GPP TSG-RAN1 #29," insert --R1-02-1435--.

At Item (56), References Cited, OTHER PUBLICATIONS, page 2, right Column, Line 56, after "3GPP TSG-RAN1 #29," insert --R1-02-1322--.

Signed and Sealed this
Sixth Day of June, 2017

Michelle K. Lee
*Director of the United States Patent and Trademark Office*

CERTIFICATE OF CORRECTION (continued)
U.S. Pat. No. 8,570,952 B2

In the Specification

At Column 3, Line 3, after the word "channels", delete "1101-N" and insert therefor --110_1-N--.

At Column 4, Line 13, after the word "channel(s)", delete "1101N" and insert therefor --110_1-N--.

At Column 5, Line 28, after the word "feedback,", delete "send" and insert therefor --sent--.

At Column 5, Line 52, after the word "database", delete "120" and insert therefor --122--.

At Column 6, Line 43, after the word "database", delete "120" and insert therefor --122--.